(12) United States Patent
Arlinghaus et al.

(10) Patent No.: US 12,516,548 B2
(45) Date of Patent: Jan. 6, 2026

(54) EXIT DEVICE WITH OVER-TRAVEL MECHANISM

(71) Applicant: Schlage Lock Company LLC, Carmel, IN (US)

(72) Inventors: Paul R. Arlinghaus, Fishers, IN (US); Jack R. Lehner, Jr., Indianapolis, IN (US)

(73) Assignee: Schlage Lock Company LLC, Carmel, IN (US)

( * ) Notice: Subject to any disclaimer, the term of this patent is extended or adjusted under 35 U.S.C. 154(b) by 0 days.

(21) Appl. No.: 18/112,219

(22) Filed: Feb. 21, 2023

(65) Prior Publication Data

US 2024/0026710 A1    Jan. 25, 2024

Related U.S. Application Data

(60) Continuation of application No. 16/242,376, filed on Jan. 8, 2019, now Pat. No. 11,585,123, which is a
(Continued)

(51) Int. Cl.
*E05B 65/10* (2006.01)
*E05B 15/00* (2006.01)
(Continued)

(52) U.S. Cl.
CPC ........ *E05B 65/1053* (2013.01); *E05B 15/004* (2013.01); *E05B 47/0657* (2013.01);
(Continued)

(58) Field of Classification Search
CPC ........ Y10T 292/0908; Y10T 292/0909; Y10T 292/091; Y10T 292/1021; Y10T 70/5159;
(Continued)

(56) References Cited

U.S. PATENT DOCUMENTS 3,730,574 A      5/1973  Zawadzki
3,854,763 A  *  12/1974  Zawadzki ........... E05B 47/0002
                                                    292/201
(Continued)

FOREIGN PATENT DOCUMENTS

DE         10150122 A1  *  5/2003  ......... E05B 17/2092
KR        100749639 B1  *  8/2007
(Continued)

OTHER PUBLICATIONS

Canadian Office Action; Canadian Intellectual Property Office; Canadian Patent Application No. 2,876,417; Aug. 11, 2016; 3 pages.
(Continued)

*Primary Examiner* — Alyson M Merlino
(74) *Attorney, Agent, or Firm* — Taft Stettinius & Hollister LLP

(57) ABSTRACT

An over-travel mechanism configured to couple an input shaft and an output shaft in an exit device assembly. The input shaft is connected to an actuator that linearly displaces the input shaft, and the output shaft is connected to a locking member of the exit device. The over-travel mechanism includes a link coupled to the output shaft, and a preloaded elastic member transmits force between the input shaft and the link. Movement of the input shaft from a first input shaft position to a second input shaft position causes the elastic member to urge the link from a first link position toward a second link position. Movement of the input shaft from the second input shaft position to a third input shaft position causes the elastic member to elastically deform without moving the link from the second link position.

17 Claims, 12 Drawing Sheets

Related U.S. Application Data division of application No. 14/585,938, filed on Dec. 30, 2014, now Pat. No. 10,174,525.

(60) Provisional application No. 61/921,838, filed on Dec. 30, 2013.

(51) Int. Cl.
*E05B 47/00* (2006.01)
*E05B 47/06* (2006.01)
*E05C 1/14* (2006.01)

(52) U.S. Cl.
CPC ............ *E05B 65/108* (2013.01); *E05C 1/14* (2013.01); *E05B 47/0001* (2013.01); *E05B 47/0012* (2013.01); *E05B 2047/0067* (2013.01); *E05B 65/1093* (2013.01); *Y10T 292/1014* (2015.04)

(58) Field of Classification Search
CPC .... Y10S 292/65; E05B 65/10; E05B 65/1046; E05B 65/1053; E05B 65/108; E05B 15/004; E05B 47/0001; E05B 47/0012; E05B 47/0004; E05B 47/0657; E05B 2047/0067; E05B 2047/0069; E05B 2047/0016; E05C 1/14
See application file for complete search history.

(56) References Cited

U.S. PATENT DOCUMENTS

| | | |
|---|---|---|
| 4,328,985 A | 5/1982 | Logan |
| 4,615,548 A * | 10/1986 | McGee ............... E05B 47/0002 70/279.1 |
| 4,801,163 A | 1/1989 | Miller |
| 4,875,722 A | 10/1989 | Miller et al. |
| 5,011,199 A | 4/1991 | Lowe et al. |
| 5,085,475 A | 2/1992 | Austin et al. |
| 5,169,185 A | 12/1992 | Slaybaugh et al. |
| 5,193,370 A | 3/1993 | Norden |
| 5,246,258 A * | 9/1993 | Kerschenbaum ... E05B 47/0002 70/279.1 |
| 5,421,178 A | 6/1995 | Hamel et al. |
| 5,628,216 A | 5/1997 | Qureshi et al. |
| 5,782,118 A | 7/1998 | Chamberlain et al. |
| 5,927,765 A | 7/1999 | Austin et al. |
| 5,988,708 A | 11/1999 | Frolov et al. |
| 6,038,896 A | 3/2000 | Chamberlain et al. |
| 6,189,939 B1 | 2/2001 | Zehrung |
| 6,769,723 B2 | 8/2004 | Cohrs, Jr. et al. |
| 7,000,954 B2 | 2/2006 | Cohrs, Jr. et al. |
| 7,469,942 B2 | 12/2008 | Whitaker et al. |
| 7,484,777 B2 | 2/2009 | Condo et al. |
| 7,503,597 B2 | 3/2009 | Cohrs, Jr. et al. |
| 7,536,885 B1 | 5/2009 | Ross et al. |
| 7,779,973 B2 | 8/2010 | Ko |
| 7,862,091 B2 | 1/2011 | Escobar |
| 7,883,123 B2 | 2/2011 | Condo et al. |
| 8,070,192 B2 * | 12/2011 | Tien ................ E05B 65/1053 70/92 |
| 8,152,206 B2 | 4/2012 | Schettel et al. |
| 8,182,003 B2 | 5/2012 | Dye et al. |
| 8,417,433 B2 | 4/2013 | Gauthier et al. |
| 8,419,083 B2 | 4/2013 | Burmesch |
| 8,480,136 B2 | 7/2013 | Dye et al. |
| 8,495,836 B2 | 7/2013 | Lowder et al. |
| 8,528,946 B2 | 9/2013 | Shen |
| 8,544,897 B2 | 10/2013 | Tien |
| 8,572,894 B2 | 11/2013 | Busch |
| 11,898,373 B2 * | 2/2024 | Woodley ............ E05B 47/0012 |
| 2002/0135188 A1 * | 9/2002 | Chang ............... E05B 47/0002 292/144 |
| 2004/0041412 A1 | 3/2004 | Cohrs, Jr. et al. |
| 2006/0042334 A1 * | 3/2006 | Huang ............... E05B 47/0002 70/279.1 |
| 2008/0012350 A1 | 1/2008 | Condo et al. |
| 2009/0174194 A1 | 7/2009 | Tien |
| 2010/0007154 A1 | 1/2010 | Schacht |
| 2010/0123323 A1 * | 5/2010 | Geringer ............ E05B 47/0012 292/164 |
| 2011/0047874 A1 | 3/2011 | Lowder et al. |
| 2013/0001960 A1 | 1/2013 | Tien |
| 2013/0192316 A1 | 8/2013 | McKibben et al. |
| 2014/0109479 A1 * | 4/2014 | Morstatt ............ E05B 65/1093 292/144 |

FOREIGN PATENT DOCUMENTS

| | | | | |
|---|---|---|---|---|
| KR | 20090040745 A | * | 4/2009 | |
| WO | WO-9934079 A1 | * | 7/1999 | ......... E05B 47/0002 |
| WO | WO-2004016887 A1 | * | 2/2004 | ......... E05B 47/0002 |

OTHER PUBLICATIONS

Canadian Office Action; Canadian Intellectual Property Office; Canadian Patent Application No. 2,876,417; Jul. 19, 2017; 6 pages.
Canadian Office Action; Canadian Intellectual Property Office; Canadian Patent Application No. 2,876,417; Aug. 2, 2018; 5 pages.

* cited by examiner

EXIT DEVICE WITH OVER-TRAVEL MECHANISM

CROSS-REFERENCE TO RELATED APPLICATIONS

The present application is a continuation of U.S. patent application Ser. No. 16/242,376 filed Jan. 8, 2019 and issued as U.S. Pat. No. 11,585,123, which is a divisional of U.S. patent application Ser. No. 14/585,938 filed Dec. 30, 2014 and issued as U.S. Pat. No. 10,174,525, which claims the benefit of U.S. Provisional Patent Application No. 61/921,838 filed on Dec. 30, 2013, the contents of each application incorporated herein by reference in their entirety.

TECHNICAL FIELD

The present invention generally relates to exit devices, and more particularly, but not exclusively, to pushbar-type exit devices with electrical actuators.

BACKGROUND

Many present approaches to exit devices equipped with electrical retraction of a latch bolt or another type of locking member suffer from a variety of limitations. For example, certain conventional devices require calibrating or adjusting the position of the retracting mechanism to ensure that the locking member is fully retracted. If the positioning or calibration of the retracting mechanism is off even slightly, conventional systems are prone to experience detrimental effects. For example, when the retracting mechanism includes a solenoid, improper positioning will result in either the locking member not fully retracting, or the solenoid's plunger not reaching the end of its travel where it exhibits maximum hold force. When the retracting mechanism includes a motor, the motor may stall if it continues to operate after the locking member is fully retracted. Stalling of the motor may cause a spike in current draw, and tends to decrease the life of the motor. Both types of retracting mechanisms have a small tolerance for total trail to fully engage, retract or lock the locking device. Therefore, a need remains for further improvements in systems and methods for electromechanical actuation of exit devices.

SUMMARY

An exemplary over-travel mechanism is configured to couple an input shaft and an output shaft in an exit device assembly. The input shaft is connected to an actuator operable to linearly move the input shaft, and the output shaft is connected to a locking member of the exit device. The over-travel mechanism includes a link coupled to the output shaft, and a preloaded elastic member transmits force between the input shaft and the link. Movement of the input shaft from a first input shaft position to a second input shaft position causes the elastic member to urge the link from a first link position toward a second link position. Movement of the input shaft from the second input shaft position to a third input shaft position causes the elastic member to elastically deform without moving the link from the second link position. Further embodiments, forms, features, and aspects of the present invention shall become apparent from the description and figures provided herewith.

DETAILED DESCRIPTION OF ILLUSTRATIVE EMBODIMENTS

Figure 1A:
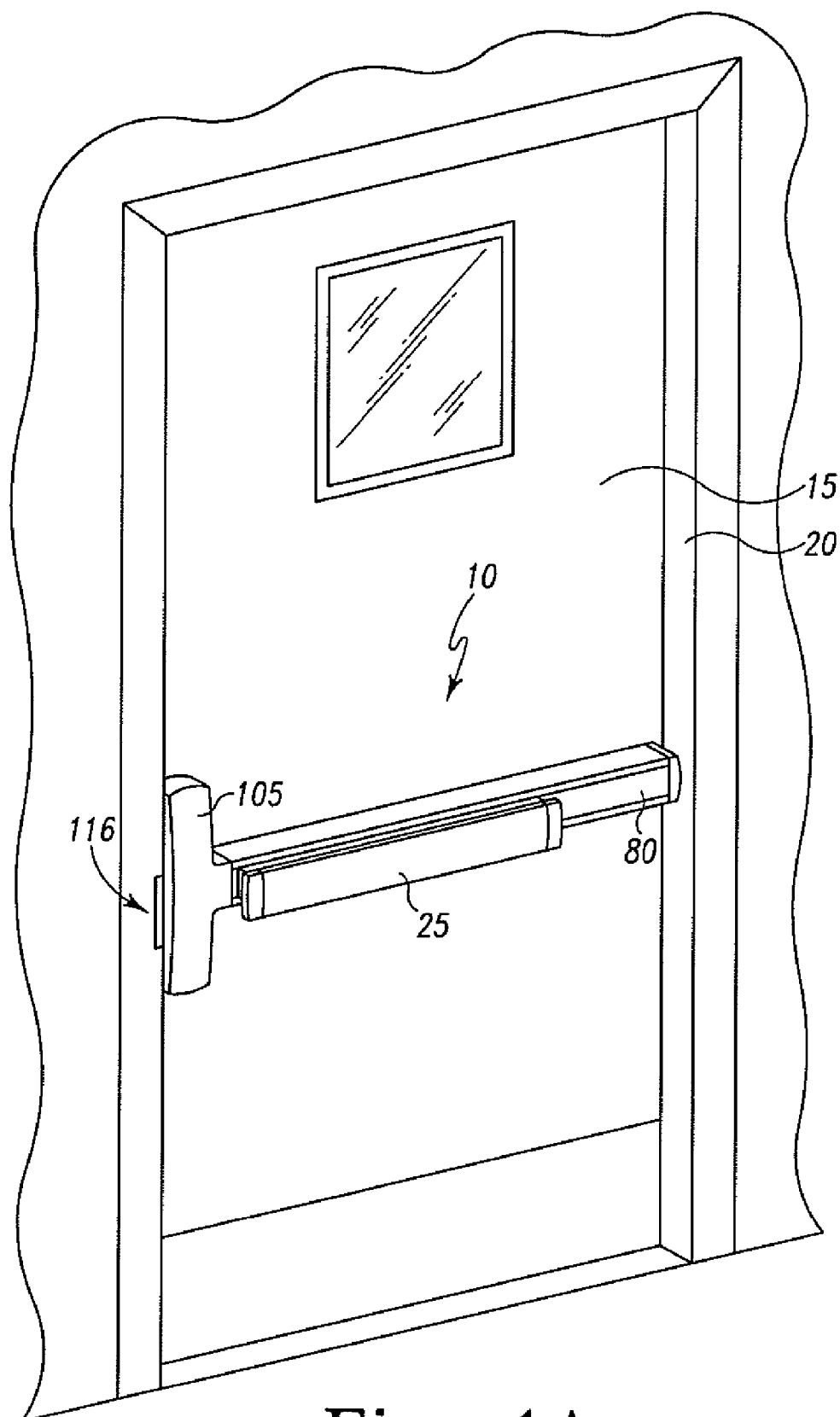
FIG. 1A illustrates an exit device according to one embodiment, as mounted on a door.

For the purposes of promoting an understanding of the principles of the invention, reference will now be made to the embodiments illustrated in the drawings and specific language will be used to describe the same. It will nevertheless be understood that no limitation on the scope of the invention is hereby intended. Any alterations and further modifications in the described embodiments, and any further applications of the principles of the invention as described herein are contemplated as would normally occur to one skilled in the art to which the invention relates.

Figure 1B:
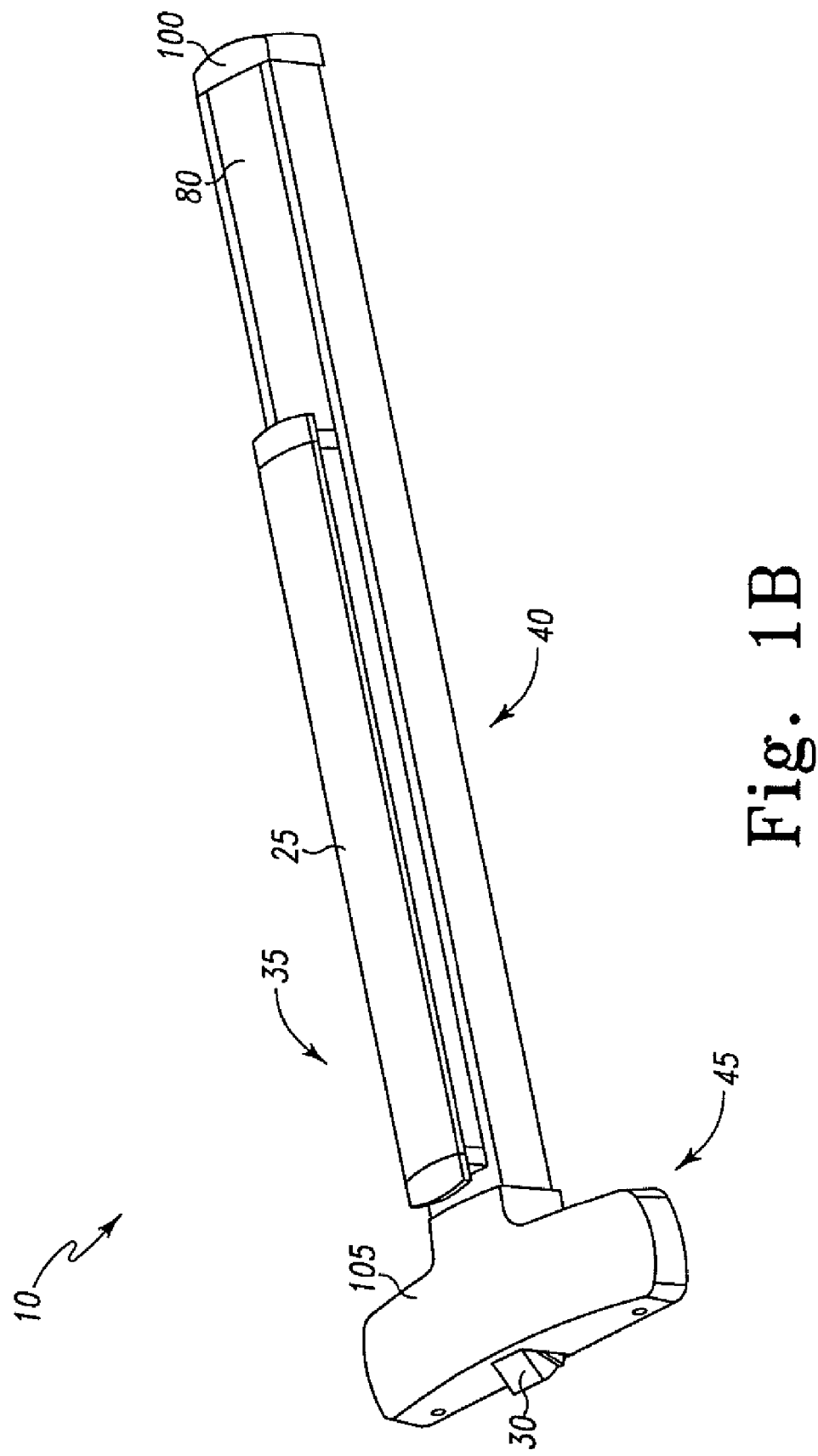
FIG. 1B illustrates the exit device of FIG. 1A with a latch bolt positioned in a first outer position.
Figure 1C:
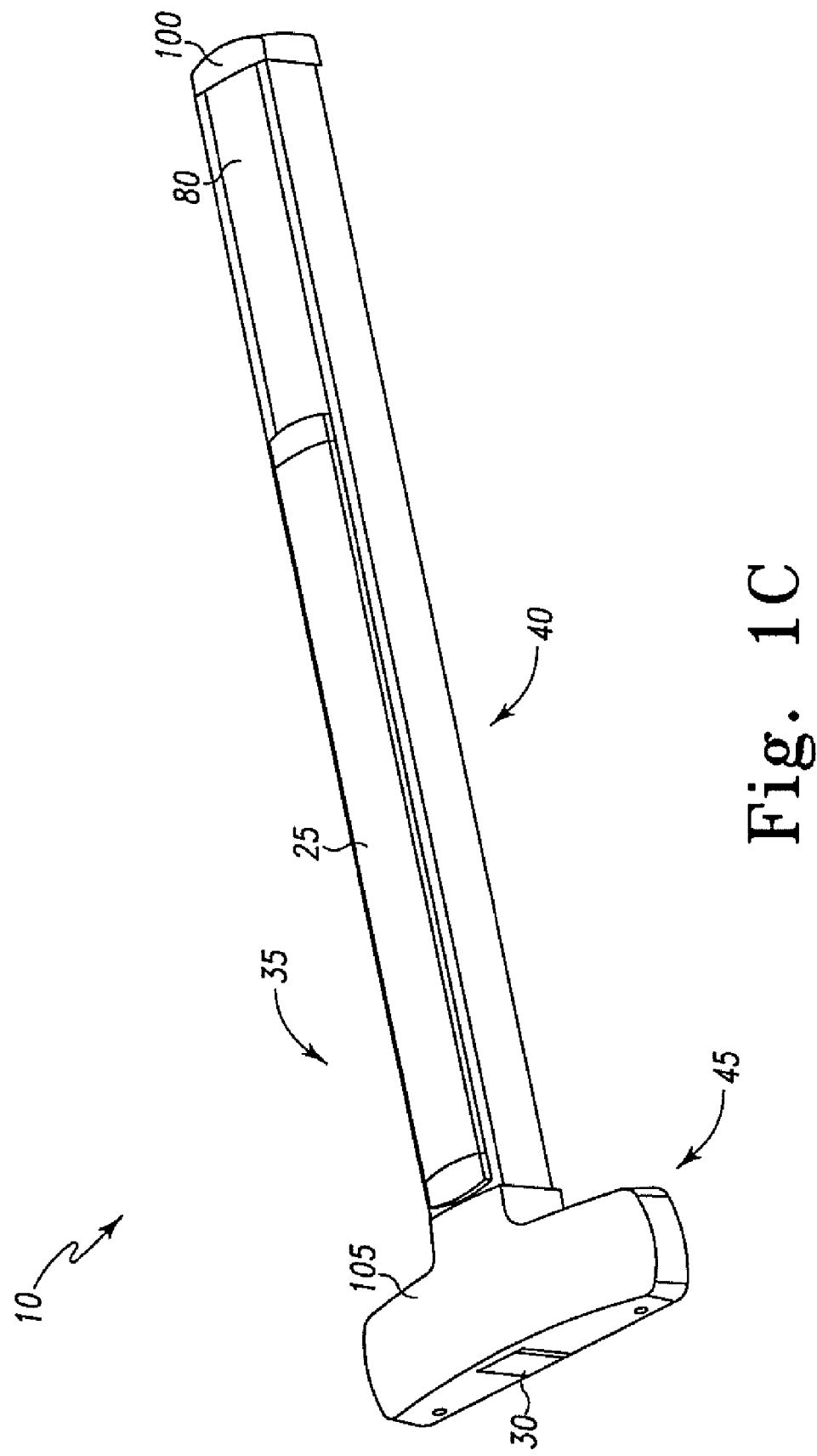
FIG. 1C illustrates the exit device of FIGS. 1A and 1B with the latch bolt positioned in a second inner position.

FIGS. 1A-1C illustrate an exit device 10 according to one embodiment. As illustrated in FIG. 1A, the exit device 10 is mounted on the inside of a door 15 for locking and unlocking the door 15. In some embodiments, the door 15 may generally be utilized as an emergency or fire exit of a building. More particularly, the exit device 10 remains locked (in FIGS. 1A and 1B characterized by a pushbar 25 being positioned in an outer state), thereby preventing a person from accessing or opening the door 15 from the outside of the building. To unlock the door 15 from the inside of the building, a user pushes or actuates the pushbar 25 (as shown in FIG. 1C), which in turn actuates a locking mechanism (further described below) to unlock the door 15. In the illustrated construction, a latch bolt 30 (FIG. 1B) operably connected to the locking mechanism extends from the exit device 10 to lock and unlock the door 15. With particular reference to FIG. 1A, the door 15 is locked when the latch bolt 30 extends from the exit device 10 and is received within a receiving aperture or against a strike on a door frame 20. The door 15 is unlocked by a user pressing the pushbar 25 (FIG. 1C), which in turn actuates the locking mechanism to retract the latch bolt 30. This type of exit device is known in the art and need not be described in further detail. It is to be understood that other constructions of the exit device 10 fall within the scope of the invention.

With reference to FIGS. 1-4, the exit device 10 includes a housing 35 with a midrail portion 40 and a head portion 45. The midrail portion 40 includes a base plate 50 for coupling the exit device 10 to a door 15, and two side walls 55 each extending outwardly from the plate 50 and including a ledge 60. The plate 50 and the side walls 55 of the midrail portion 40 define an inner space 65 for enclosing a control system 70 and a locking mechanism 75. The pushbar 25 is coupled to the locking mechanism 75 and is at least partially received within the inner space 65. In the illustrated embodiment, the pushbar 25 extends from the left end to a middle section of the midrail portion 40 (with respect to FIG. 2), and cooperates with the midrail portion 40 to substantially enclose the locking mechanism 75. The pushbar 25 includes a head portion 136 with two inwardly extending walls 137 (only one shown in FIG. 4) and end caps 138 at the ends of the pushbar 25, with each end cap 138 defining a channel.

The control system 70 is located within the inner space 65 toward the right end of the midrail portion 40. A sliding plate 80 is received on the right end of the midrail portion 40 for enclosing the control system 70 in cooperation with the midrail portion 40. Accordingly, a user may access the control system 70 by at least partially sliding the plate 80 from engagement with the midrail portion 40. An end cover 100 is located at the right end of the midrail portion 40. The end cover 100 cooperates with the sliding plate 80 to enclose the control system 70 and the locking mechanism 75 within the inner space 65.

Figure 2:
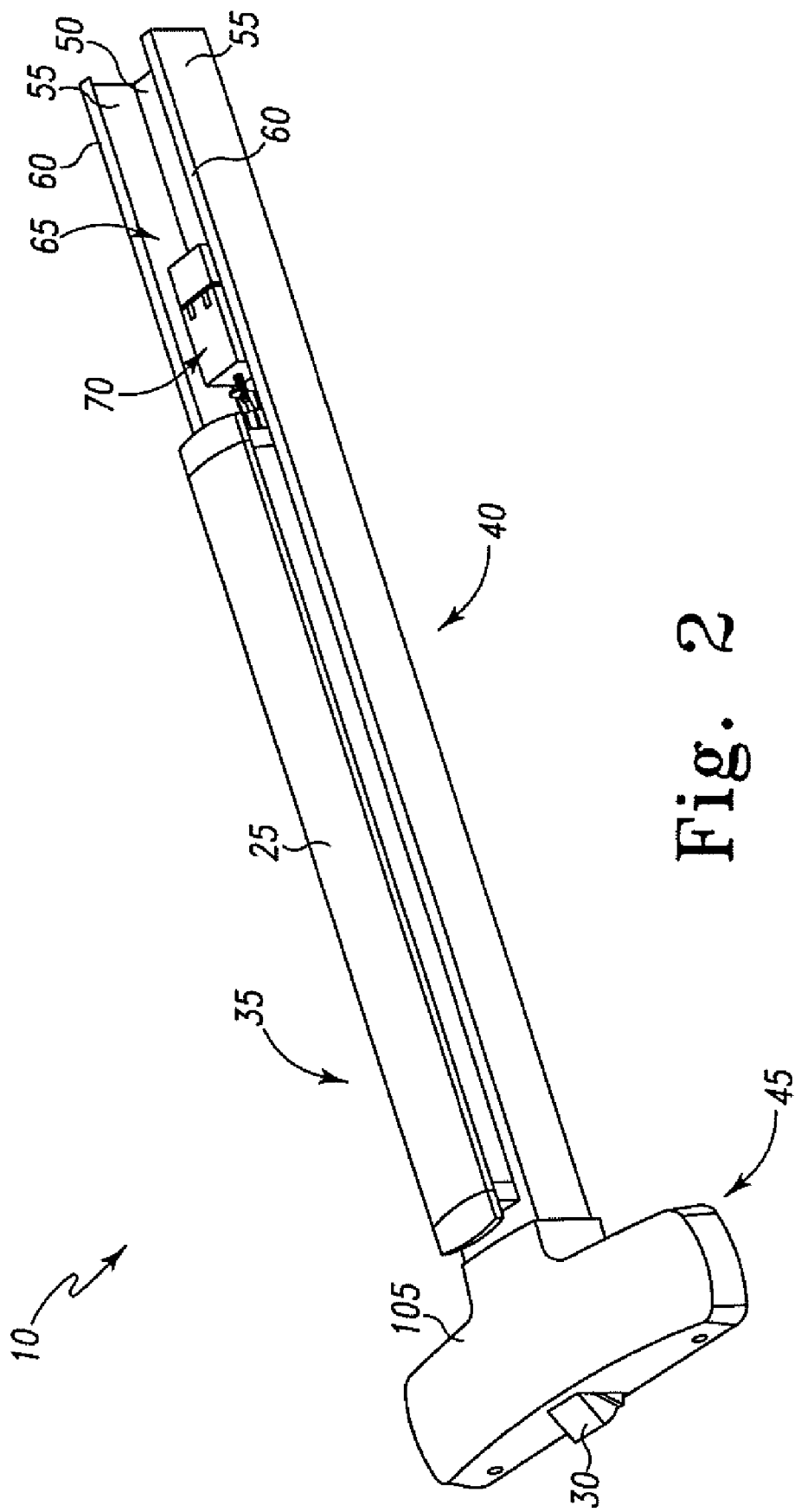
FIG. 2 illustrates a control system according to one embodiment for use in association with the exit device.
Figure 3:
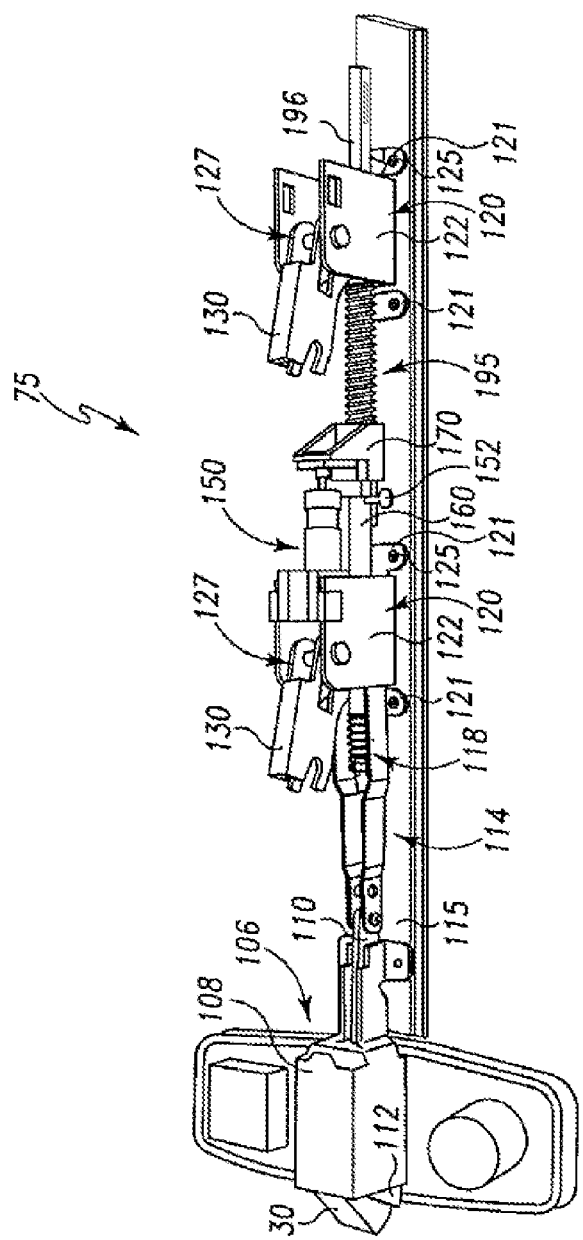
FIG. 3 illustrates the control system connected to a locking mechanism of the exit device.

With reference to FIGS. 2 and 3, the head portion 45 of the exit device 10 includes a cover 105 for enclosing a head mechanism 106 connected to the locking mechanism 75, and being operable to actuate the latch bolt 30. The head mechanism 106 includes a housing 108, a locking link 110, the latch bolt 30, and an auxiliary bolt 112. The link 110 is also coupled to a shaft 160 of the locking mechanism 75 via a split link 114. The split link 114 is connected to the link 110 such that the link 110 and the split link 114 are displaced together. The split link 114 is connected to the shaft 160 by a lost-motion connection. A spring 118 extends between the split link 114 and the end of the shaft 160 to bias the split link 114 to the left relative to the shaft 160. Movement of the split link 114 to the right compresses the spring 118, but does not move the shaft 160. However, movement of the shaft 160 to the right pulls the split link 114 to the right.

The head mechanism 106 typically includes a latch bolt link positioned within the housing 108 to couple the latch bolt 30 to the link 110. In the illustrated embodiment, the latch bolt 30 and the auxiliary bolt 112 extend from one end of the housing 108 opposite the link 110 to engage a strike 116 (partially illustrated in FIG. 1A). The latch bolt 30 is pivotally coupled to the housing 108 such that, when the link 110 pulls the latch bolt link, the latch bolt 30 pivots from an extended position (as shown in FIGS. 1B, 2 and 3) to a retracted position (as shown in FIG. 1C).

The auxiliary bolt 112 is coupled to the latch bolt 30 for movement with the latch bolt 30 between the extended position and the retracted position. The auxiliary bolt 112 is also movable (e.g., retractable) relative to the latch bolt 30. The spring 118 and the lost-motion connection between the split link 114 and the shaft 160 prevent independent inward movement of the latch bolt 30, such as when the door 15 is closed and the latch bolt 30 passes the strike 116, to transfer motion from the head mechanism 106 to the locking mechanism 75. More specifically, when the exit device 10 is in its locked position (characterized by the pushbar 25 and the latch bolt 30 being positioned in their outer states), movement of the latch bolt 30 from its extended position (FIG. 1B) to its retracted position (FIG. 1C) compresses the spring 118 as the split link 114 moves to the right relative to the shaft 160. However, the motion of the split link 114 is not transferred to the shaft 160. Once the latch bolt 30 is free to return to its extended position, such as after it has passed the strike 116 during closing of the door 15, the spring 118 exerts sufficient force on the split link 114 to move the split link 114 to the left relative to the shaft 160 and to cause the latch bolt 30 to return to its extended or outer position.

In one example, when the door 15 is closed (FIG. 1A), the latch bolt 30 is in the extended position to engage the strike 116. The auxiliary bolt 112 contacts the strike 116 such that the strike 116 pushes the auxiliary bolt 112 toward the retracted position. When the latch bolt 30 is extended and the auxiliary bolt 112 is retracted, the auxiliary bolt 112 actuates or allows actuation of a deadlock mechanism to a position in engagement with the latch bolt 30 and/or the link 110. In this position, the deadlock mechanism inhibits retraction of the latch bolt 30, thereby preventing the door 15 from being forced or pushed open. When a user wishes to open the door 15, the user actuates the pushbar 25 to move the shaft 160, and thereby the link 110, to the right. As the link 110 moves to the right, the link 110 disengages the deadlock mechanism. The link 110 also pulls the latch bolt link so as to pivot the latch bolt 30 to the retracted position, thereby allowing the door 15 to be opened.

Figure 4:
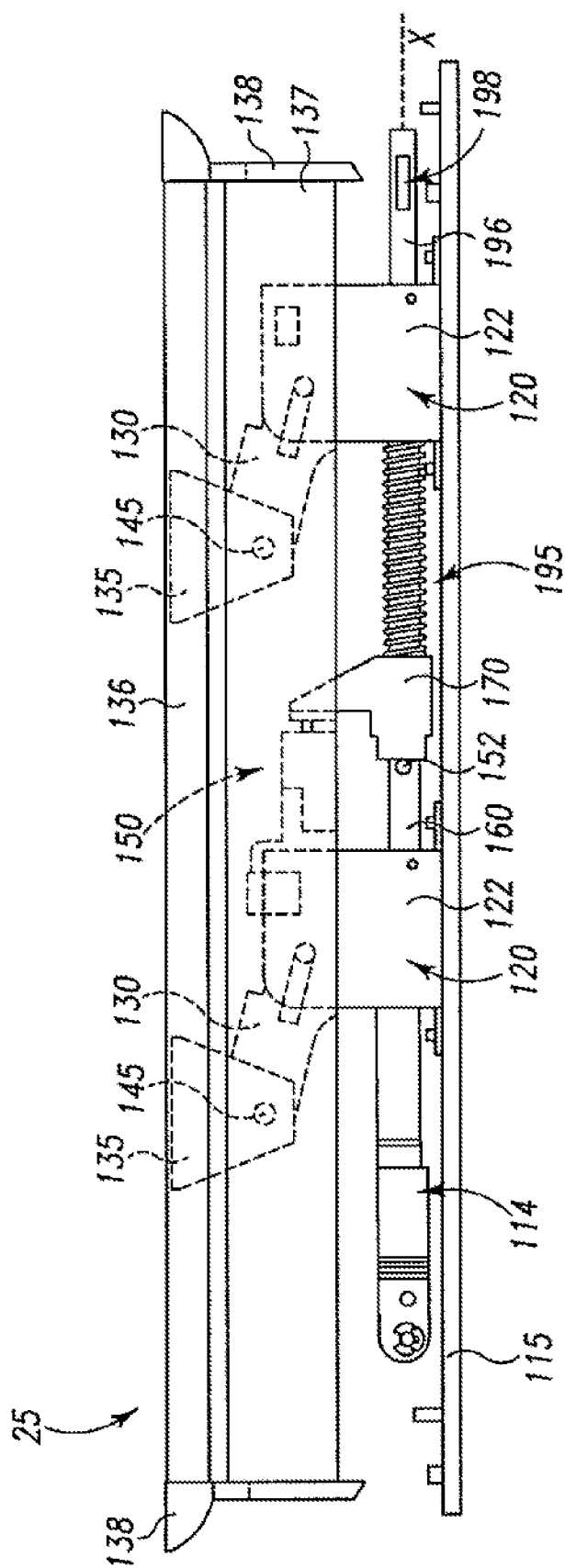
FIG. 4 illustrates a portion of the locking mechanism operably connected to a pushbar of the exit device.

With reference to FIGS. 3 and 4, a base plate 115 supports the locking mechanism 75 and the control system 70. The plate 115 can be coupled to the plate 50 of the midrail portion 40 by any conventional means to provide support to the locking mechanism 75 and the control system 70. The locking mechanism 75 includes two base brackets 120 fixedly coupled to the plate 115 and longitudinally spaced apart from one another in the longitudinal direction of the plate 115. Each bracket 120 includes a base portion with extensions 121 for receiving screws 125. Each bracket 120 also includes outwardly extending wall portions 122 substantially parallel to one another and spaced along the width of the plate 115.

Each bracket 120 supports a bell crank mechanism 127 (partially illustrated in FIG. 3) including a bell crank link 130 coupled to a pushbar support bracket 135 and the shaft 160. Details regarding the bell crank mechanism 127 are known by those of ordinary skill in the art and therefore will not be described in detail herein. The bell crank mechanism 127 transfers motion between the pushbar 25 and the shaft 160 upon actuation of one or the other. The pushbar 25 is mounted on the support brackets 135 and at least partially encloses the locking mechanism 75. A pin 145 couples each support bracket 135 to the associated bell crank link 130 and allows pivotal movement between the support bracket 135 and the bell crank link 130. Accordingly, inward movement (downward in FIG. 4) of the pushbar 25, and therefore of the support brackets 135, allows the bell crank mechanism 127 to move the shaft 160 to its unlocked position.

A spring 195 is mounted on the shaft 160 between a bracket 170 and a stop adjacent the right bracket 120. In the illustrated construction, the bracket 170 is slideably mounted on the shaft 160, and motion of the bracket 170 to the left along the shaft 160 is limited by a pin 152 extending through the shaft 160. The spring 195 exerts a force on the bracket 170, and thereby on the shaft 160, to bias the shaft 160 toward its locked position (i.e., to the left). A damping mechanism 150 extends between the left bracket 120 and the bracket 170. As indicated above, inward movement of the pushbar 25 causes movement of the shaft 160 toward the unlocked position (i.e., to the right). During movement of the shaft 160 to the right, the pin 152 moves with the shaft 160 and acts against the bracket 170 to thereby cause the bracket 170 to move to the right with the shaft 160, which in turn causes the spring 195 to compress. When the pushbar 25 is released, the force of the spring 195 on the bracket 170 moves the shaft 160 to the left (i.e., the locked position). During movement of the shaft 160 to the left, the damping mechanism 150 acts against the bracket 170 and limits the speed with which the shaft 160 moves to the left. This in turn limits the speed of outward movement of the pushbar 25. The damping mechanism 150 does not limit the speed with which the shaft 160 moves to the right (i.e., the unlocked position). Thus, the pushbar 25 can be pushed in and the door 15 can be unlocked as quickly as possible.

Figure 5:
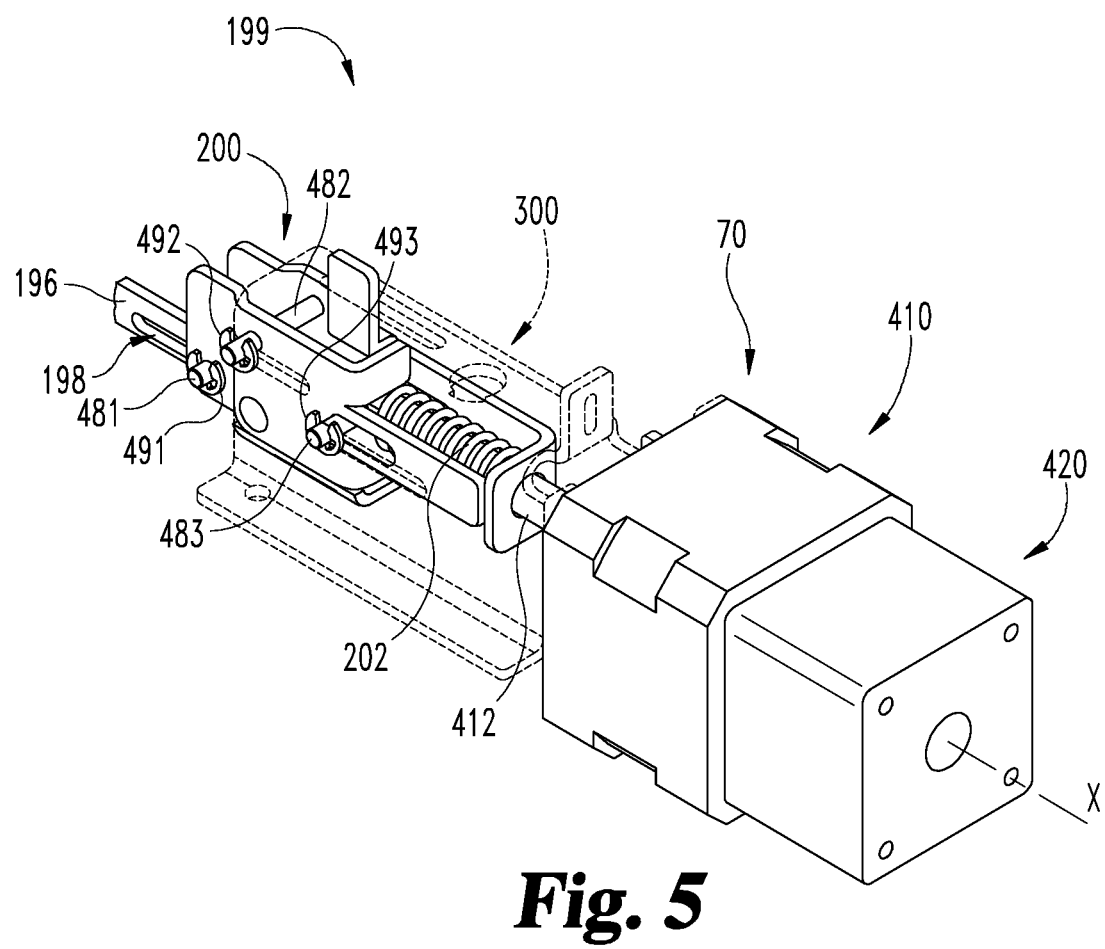
FIG. 5 illustrates an over-travel assembly and control system according to one embodiment.

With reference to FIGS. 4 and 5, a beam 196 is coupled to the right end of the shaft 160 and includes an elongated aperture or slot 198 extending from a middle section to the right end of the beam 196. The beam 196 may include an aperture aligned with an aperture in the shaft 160 for receiving a pin, thereby coupling the shaft 160 and the beam 196 to the right of the bell crank link 130 (FIG. 3). The beam 196 is also coupled to an over-travel assembly 199 configured to move the beam 196 upon actuation of the control system 70. The over-travel assembly 199 includes a drive link 200 and an elastic member (depicted as a spring 202), and may further include a housing 300. The drive link 200 is coupled to the beam 196 with a lost-motion connection, thereby allowing the beam 196 to move in the longitudinal direction with respect to the link 200. The link 200 is positioned within the housing 300 and is movable in the longitudinal direction with respect to the housing 300.

The control system 70 includes a motor 410 having an axially movable output shaft 412, and a control module 420 configured to control operation of the motor 410. The motor 410 is preferably a stepper motor such that axial movement of the shaft 412 can be measured or defined in a number of steps of the motor 410. However, other constructions of the control system 70 may include another form of motor. The output shaft 412 has external threads that threadedly engage internal threads on the rotor of the motor 410 such that rotation of the rotor causes axial movement of the shaft 412 along the longitudinal axis X. When the motor 410 rotates the nut in one direction, the motor shaft 412 is pulled inward (i.e., toward the control module 420). When the motor 410 rotates the nut in the opposite direction, the motor shaft 412 is pushed outward (i.e., toward the beam 196). The motor shaft 412 may include a splined section in engagement with a corresponding splined section in the motor 410, thereby preventing the motor shaft 412 from rotating relative to the motor 410 as the nut rotates.

In the illustrated embodiment, the motor 410 is a stepping motor, and the control module 420 sends a series of electrical pulses or steps to the motor 410 to control the linear motion of the motor shaft 412. The number of pulses sent by the control module 420 controls the distance that the motor shaft 412 is displaced. In other embodiments, the linear motion may be provided in another manner. For example, in certain embodiments, the control system 70 may include a rack and pinion linear actuator, a geared design using chains or belts, a linear motor actuator, or other types of motion control systems. Such alternatives may also be designed with or without stepping motors.

Figure 6:
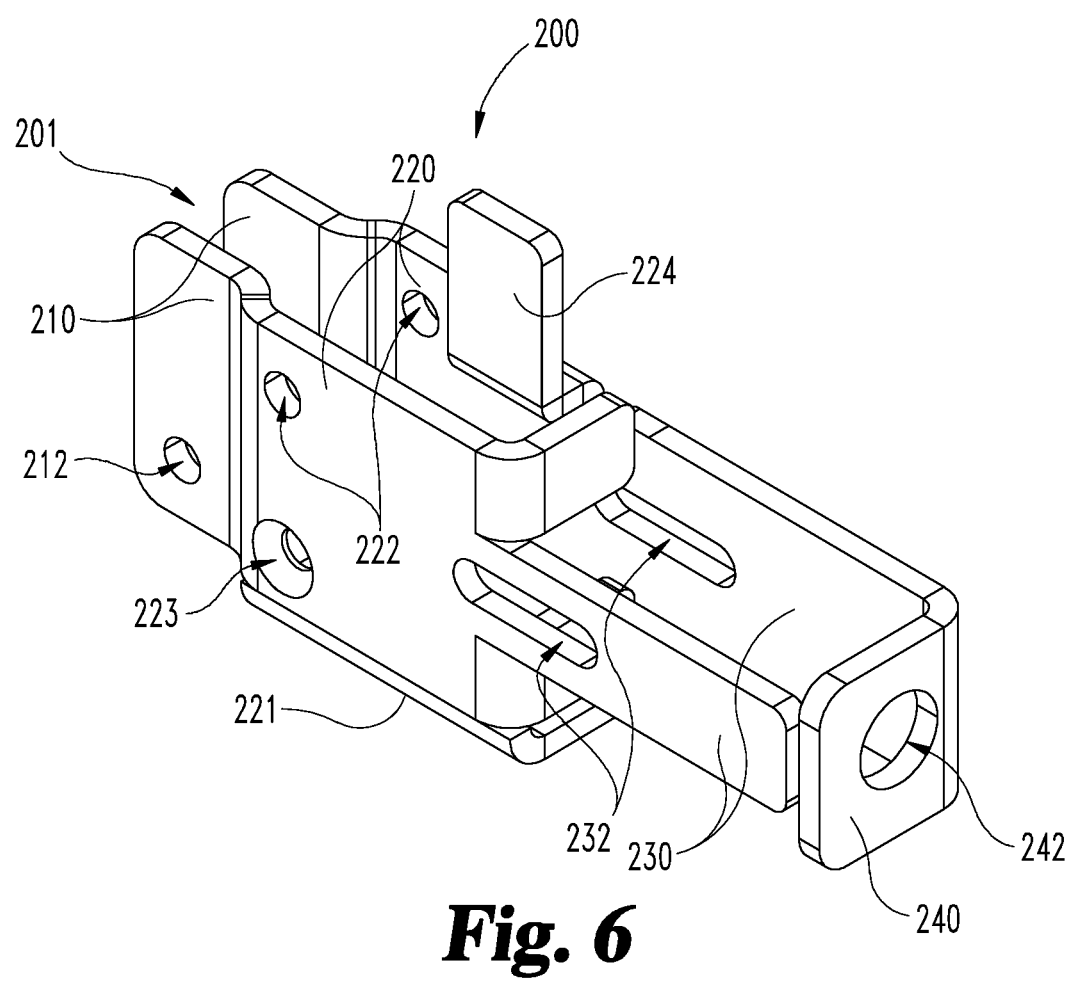
FIG. 6 illustrates a link used in association with the over-travel assembly of FIG. 5.

With reference to FIG. 6, the link 200 includes a channel 201 defined by coupling arms 210, side walls 220, and arms 230, all of which are substantially parallel to one another. The channel 201 is further defined by a bottom wall 221 connecting the side walls 220, and an end wall 240 extending from one of the arms 230 toward the other of the arms 230. The beam 196 is positioned at least partially within the channel 201, and the slot 198 is positioned between the coupling arms 210 and is aligned with openings 212 formed in the coupling arms 210. A pin 481 extends through the openings 212 and the slot 198, and is prevented from moving in the transverse direction (i.e., in a direction perpendicular to the longitudinal axis X). In the illustrated form, a circlip 491 substantially prevents movement of the pin 481 in one of the transverse directions, and movement of the pin 481 in the other transverse direction is also substantially prevented, for example by a second circlip or a portion of the pin 481 having a diameter greater than that of the opening 212.

Each of the side walls 220 includes an opening 222 configured to receive a guide pin 482. One or both of the side walls 220 may also include a screw hole 223. The arms 230 extend from the side walls 220 in the longitudinal direction, and each includes a longitudinal slot 232 configured to slidingly receive a pin 483. The end wall 240 is formed on one of the arms 230 and includes an opening 242. When the over-travel assembly 199 and the control system 70 are assembled, the shaft 412 extends through, but is not threaded into, the opening 242. As further explained below, the over-travel assembly 199 is actuated by the motor shaft 412 to move the link 200 between extended and retracted positions.

Figure 7:
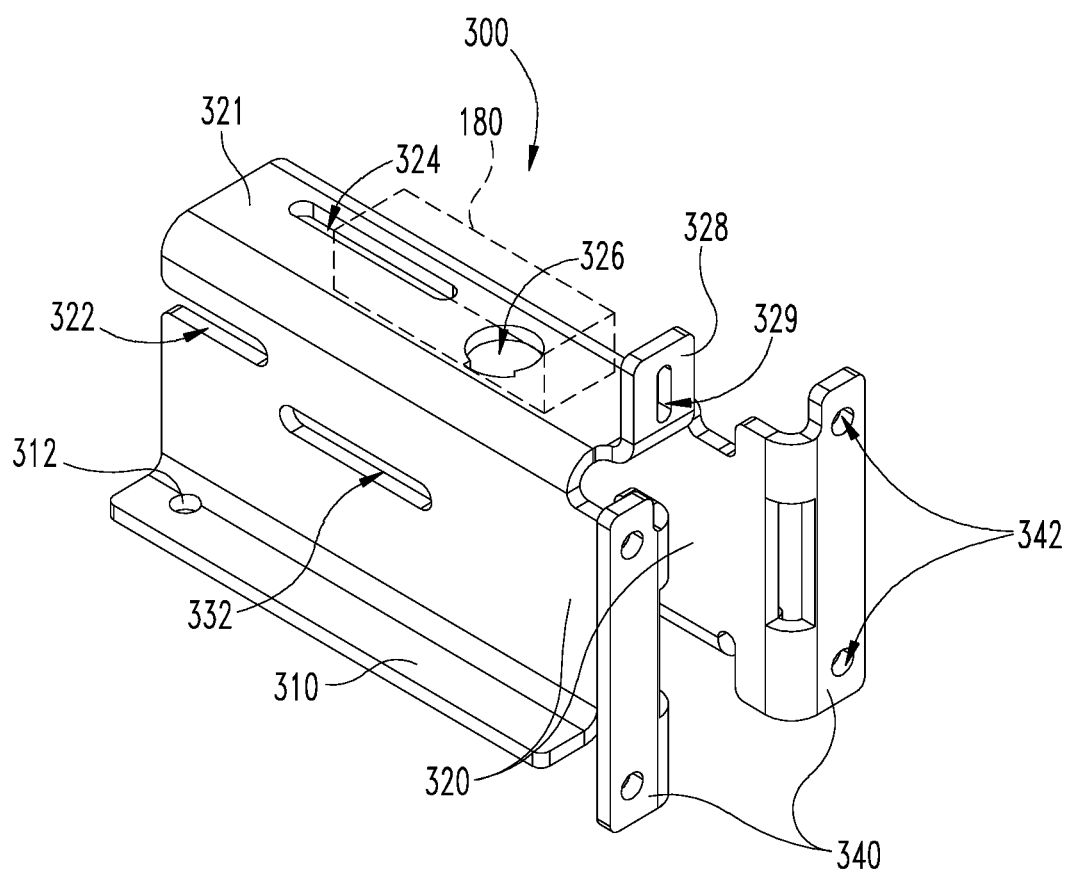
FIG. 7 illustrates a housing used in association with the over-travel assembly of FIG. 5.

With additional reference to FIG. 7, the housing 300 includes base flanges 310, a pair of substantially parallel side walls 320, and may further include L-shaped mounting arms 340 extending from the side walls 320. The base flanges 310 include openings 312 configured to receive fasteners for coupling the housing 300 to the plate 115, thereby providing the housing 300 with a fixed position with respect to the door 15.

The side walls 320 are formed on opposite sides of the link 200 to help guide the link 200 in a longitudinal direction, and also include guide slots 322 aligned with the link openings 222. The guide pin 482 extends through the openings 222 and the guide slots 322, and is held in place by a circlip 492. The guide slots 322, the pin 482, and the circlip 492 restrict movement of the link 200 to the longitudinal direction, thereby substantially preventing the link 200 from pivoting during extension or retraction of the link 200 with respect to the housing 300.

The side walls 320 are connected by a top wall 321, and include slots 332 configured to slidingly receive the pin 483. During assembly, the motor shaft 412 is passed through the opening 242 and the spring 202, and the spring 202 is preloaded with a preloading deformation. In the illustrated embodiment, the spring 202 is a compression-type coil spring, and the preloading deformation is a preloading compression of the spring 202. It is also contemplated the spring 202 may be replaced by a tension spring which interconnects the pins 482, 483. In such an embodiment, the preloading deformation is a preloading tension in the tension spring. In further embodiments, the spring 202 may be replaced by another type of elastic member such as, for example, a torsion spring.

Once the spring 202 is preloaded, the pin 483 is passed through the slots 232, 332 and an opening formed in the motor shaft 412, and is held in place by a circlip 493. In this manner, the spring 202 is retained between the pin 486 and the end wall 240 in a compressed state, thereby providing a pre-loading force that resists relative motion of the link 200 and the motor shaft 412. The housing slots 332 extend a greater distance in the longitudinal direction than the link slots 232. Accordingly, the guide pin 483 (and therefore the motor shaft 412) has a greater range of motion with respect to the housing 300 than with respect to the link 200. The mounting arms 340 are positioned adjacent the motor 410, and may include openings 342 configured to receive fasteners for coupling the housing 300 to the motor 410.

Figure 8:
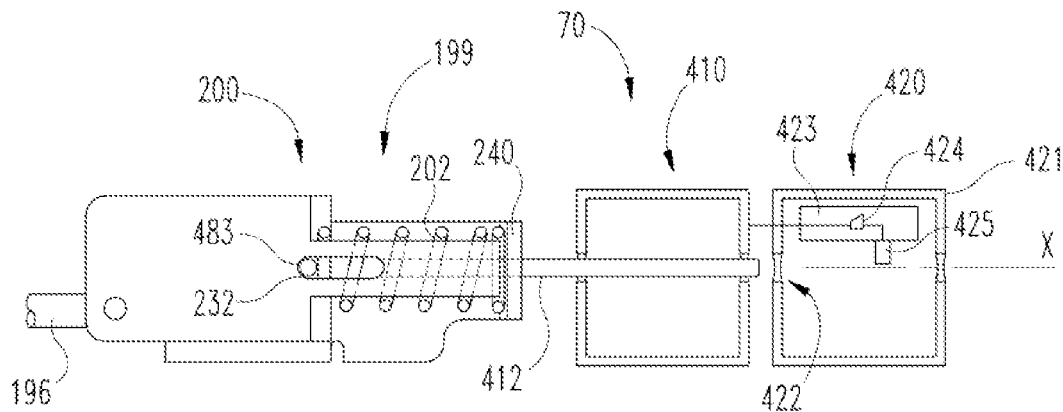
FIGS. 8-10 illustrate various operational stages of an over-travel assembly according to one embodiment.
Figure 10:
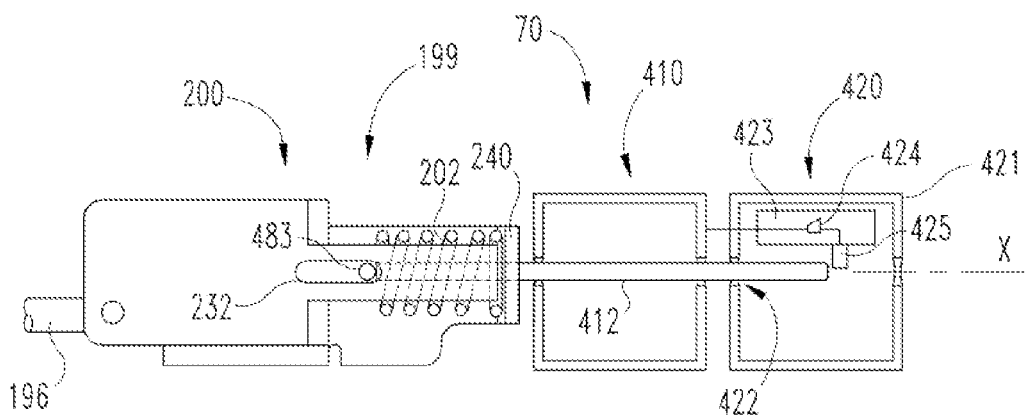

With additional reference to FIG. 8, the exemplary control module 420 includes a housing 421 having an opening 422 configured to receive the motor shaft 412. The control module 420 also includes a printed circuit board (PCB) 423 operably connected to the motor 410 and supporting a microcontroller 424, and may further include a sensor 425 in communication with the microcontroller 424. In the illustrated embodiment, the sensor 425 is configured to send a stop signal to the microcontroller 424 when the motor shaft 412 is fully retracted and the motor shaft 412 is in close proximity to the sensor 425 (FIG. 10). In other forms, the sensor 425 may be configured to sense positions of the motor shaft 412 other than the fully retracted position. An exemplary form of a control module 420 utilizing such a sensor arrangement is described below. The microcontroller 424 may also be capable of generating a status signal indicative of the status of the motor 410 and/or the locking mechanism 75.

In the illustrated embodiment, operation of the exit device 10 includes manually unlocking the exit device 10, and may further include manually or automatically dogging the exit device 10. Manually unlocking the exit device 10 includes operating the locking mechanism 75 by manually actuating the pushbar 25 from its outer state (FIGS. 1A, 1B) to its inner state (FIG. 1C). Although not shown, the exit device 10 may include a mechanically operated dogging device wherein a user is able to "lock" the locking mechanism 75 in its unlocked position or inner state of the pushbar 25. Automatically dogging the exit device 10 includes operating the motor 410 to retract the motor shaft 412 to the right along the longitudinal axis X to an over-travel position, and retaining the motor shaft 412 in the over-travel position, the details of which are described in further detail below.

During manual operation of the exit device 10, the door 15 is unlocked by inwardly pushing the pushbar 25. Inward movement of the pushbar 25 translates into movement of the shaft 160 (to the right) via the bell crank mechanism 127. As a result, the split link 114 pulls the link 110 which in turn actuates the latch bolt 30 for unlocking the door 15. Also, moving the shaft 160 to the right compresses the spring 195, thereby generating a force biasing the shaft 160 to the left. The biasing force causes the shaft 160, pushbar 25 and latch bolt 30 to move to their locked or outer positions once the user releases the pushbar 25.

Moving the shaft 160 to the right also causes the beam 196 to move in the same direction. The beam 196 can move between the locked position and the unlocked position without affecting the link 200 because of the lost-motion connection between the beam 196 and the link 200. More specifically, restricted movement of the pushbar 25 and/or operation of locking mechanism 75 allows travel of the beam 196 with respect to the link 200 such that the beam 196 does not reach or engage the motor shaft 412. In the illustrated embodiment, inward travel of the pushbar 25 is limited by engagement of the pushbar 25 (e.g., extending walls 137 and/or end caps 138) with the plate 115 and/or one or more stops within the exit device 10. Further, one or more stops within the exit device 10 can also restrict actuation of the locking mechanism 75 by restricting movement of one or more elements thereof in at least one direction (e.g., shaft 160 or latch bolt 30).

Figure 9:
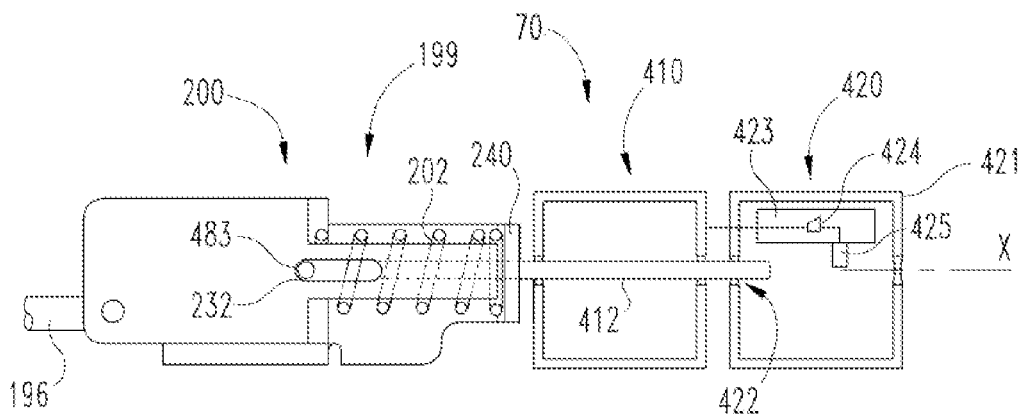

Automatic operation of the exit device 10 is described with reference to FIGS. 2, 3, and 8-10. Particularly, FIGS. 8-10 are schematic representations of the over-travel assembly 199 as the motor shaft 412 progresses from a locking position (FIG. 8) to an unlocking position (FIG. 9) and to an over-travel position (FIG. 10). In the interest of clarity, certain elements and features not relevant to the following description (such as the slot 198 and the housing 300) are omitted from FIGS. 8-10.

FIG. 8 depicts the motor shaft 412 in the locking position. With the motor shaft 412 in the locking position, wherein the link 200 is in an extended position, and the pushbar 25 and the latch bolt 30 are positioned in their outer states. The microcontroller 424 begins operation of the exit device 10 in response to a start condition, such as a power supply providing power to the control system 70, and more particularly to the microcontroller 424. Other start conditions are also contemplated as falling within the scope of the invention such as, for example, a proper credential provided to a reader associated with the exit device 10. In the illustrated embodiment, power is not directly transmitted to the motor 410. Instead, the microcontroller 424 administers power for the power-based functions of the exit device 10, which also includes relaying power to the motor 410. In one embodiment, the power supply is an external power supply that is in turn connected to a 120/240 VAC source. However, it should be understood that other conventional methods of supplying power also fall within the scope of the invention.

As the motor 410 retracts the motor shaft 412, the guide pin 483 urges the spring 202 toward the motor 410. The pre-loaded spring 202 resists relative motion of the link 200 and the motor shaft 412, and motion of the guide pin 483 toward the motor 410 results in the spring 202 urging the end wall 240 toward the motor 410 substantially without further compression of the spring 202. As such, substantially all motion of the motor shaft 412 is translated to the link 200. It is also contemplated that that the spring 202 may deform slightly such that there is not a one to one correlation of movement of the motor shaft 412 and the link 200. As the link 200 travels from the extended position to the retracted position, the beam 196 is pulled toward the motor 410, thereby causing the pushbar 25 and the latch bolt 30 to move toward their unlocked or inner states.

FIG. 9 illustrates the motor shaft 412 in the unlocking position. With the motor shaft 412 in the unlocking position, the link 200 is in a retracted position, and the pushbar 25 and the latch bolt 30 are positioned in their inner states. In this configuration, the pushbar 25 may be in contact with the base plate 115 or the stops, such that further retraction of the pushbar 25, and thus of the shaft 160, is prevented. When the shaft 160 reaches the end of its travel, the link 200 cannot continue to move toward the motor 410. As the motor 410 continues to retract the motor shaft 412, the guide pin 483 travels along the slot 232, thereby further compressing the spring 202 as the motor shaft moves toward the over-travel position (FIG. 10).

FIG. 10 depicts the motor shaft 412 in the over-travel position. With the motor shaft 412 in the over-travel position, the spring 202 is compressed beyond the pre-loading compression, and the motor shaft 412 is in close proximity to the sensor 425. When the motor shaft 412 reaches the over-travel position and is detected by the sensor 425, the sensor 425 sends a stop signal to the microcontroller 424. In the illustrated embodiment, the sensor 425 is a solid state switch configured to send the stop signal when the motor shaft 412 is detected by the sensor 425. However, other sensor and sensor configurations are also contemplated. Upon receiving the stop signal, the microcontroller 424 enters a holding operation wherein the power supplied to the motor 410 is reduced to a holding power sufficient to hold the link 200 in the retracted position against the biasing force of the springs 195, 202. After a predetermined time has elapsed, the microcontroller 424 cuts power to the motor, and the springs 195, 202 urge the link 200 toward the extended position, the motor shaft 412 toward the locking position, and the pushbar 25 and latch bolt 30 toward their outer states.

In the illustrated embodiment, the microcontroller 424 enters the holding operation upon receiving a stop signal, which is generated when the motor shaft 412 is in close proximity to the sensor 425. It is also contemplated that that the microcontroller 424 may stop the motor 410 based upon additional or alternative stop conditions. For example, the sensor 425 may sense the current being drawn by the motor, and the microcontroller 424 may interpret a threshold current as the stop condition. In further embodiments, the control module 420 does not necessarily have to include a sensor 425, and the microcontroller 424 may terminate operation of the motor 410 after a predetermined time has elapsed, or after a predetermined number of pulses have been sent to the motor 410.

In certain embodiments in which the sensor 425 is utilized, the sensor 425 may be configured as a Hall effect sensor cooperating with a magnet mounted on the end of the motor shaft 412. The Hall effect sensor generates a voltage signal indicative of the distance between the sensor 425 and the magnet, which signal may be interpreted by the microcontroller 424 as the position of the motor shaft 412. In such embodiments, the stop condition may be a threshold level of the voltage signal indicating the motor shaft 412 is in the over-travel position. In embodiments in which the sensor 425 is a Hall effect sensor, the voltage signal may also be utilized by the microcontroller 424 in additional or alternative procedures, such as anti-tampering procedures, procedures for reacting to external and/or environmental agents, and/or one or more responses to door slam conditions. Illustrative forms of such additional procedures are described in commonly-owned U.S. Pat. No. 8,182,003 to Dye et al., column 12, line 43 through column 14, line 18 and FIGS. 1A-1C, 2, and 9, the contents of which are incorporated herein by reference.

Regardless of the precise stop condition utilized by the microcontroller 424, the over-travel assembly 199 provides an extended range in which the link 200 is in the retracted position and the motor 410 can continue to operate without stalling. Because the motor shaft 412 can continue to travel inward despite the fact that latch bolt 30 is fully retracted, this range may be considered an over-travel window. In embodiments which utilize a solenoid in place of the motor 410, this over-travel window enables the plunger to reach the end of its travel where it has the highest holding force. Whatever type of actuating system is used, the over-travel window enables increased tolerances during manufacture and installation, and may obviate the need for repositioning and/or recalibration of the elements and features of the control system 70.

As can be seen from the foregoing, the over-travel assembly 199 translates motion of the motor shaft 412 to motion of a locking member. In the illustrated form, the exit device 10 is a rim-type exit device, and the locking member is the latch bolt 30. However, it is also contemplated that the over-travel assembly 199 may be utilized in other forms of exit devices such as, for example, a mortise lock or a remote latching system which may be, for example, of the surface vertical type or the concealed vertical type. In remote latching systems, the locking member may be a latch or a bolt which protrudes from the upper, lower, or side surface of the door 15 when the motor shaft 412 is in the locked position. Furthermore, the exit device may be of the multi-point latching type which may include a plurality of latches or bolts.

While the locking members described herein include latches and bolts, it is also contemplated that the locking member may be of another form. For example, in certain embodiments, the exit device may be a delayed egress exit device such as, for example, the type described in commonly-owned U.S. Pat. No. 5,085,475 to Austin et al., and the locking member may be a blocking member connected to the beam 196. The blocking member may be operable in a blocking position wherein retraction of the latch bolt 30 is prevented and an unblocking position wherein retraction of the latch bolt 30 is enabled. In one such embodiment, pushing the pushbar 25 to the inner state causes a sensor to send a signal to the microcontroller 424, thereby indicating that a user is attempting to operate the exit device 10. Upon receiving the signal, the microcontroller 424 does not supply power to the motor 410 until a predetermined delay time has elapsed. During this delay time, the microcontroller 424 may trigger an alarm such as, for example, an audible alarm which indicates that a person is attempting to open the door 15. Once the microcontroller 424 provides power to the motor 410, the over-travel assembly 199 functions as described above, and the beam 196 moves the blocking member from the blocking position to the unblocking position. Once the blocking member is in the unblocking position, the latch bolt 30 can retract and the door 15 can be opened. In such delayed egress embodiments, the over-travel window provided by the over-travel assembly 199 ensures that the blocking member moves fully into the blocking or unblocking position, while providing the previously-described increased tolerances and benefits associated therewith.

Certain forms of the over-travel assembly 199 may include additional or alternative features. For example, with reference to FIGS. 5-7, the over-travel assembly 199 may include dogging features that allow a user to selectively retain the latch bolt 30 in the inner position such that the door 15 remains unlocked. The link 200 may include a dogging tab 224 extending outward (i.e., in the direction of movement of the pushbar 25 from the inner state to the outer state) through a slot 324 in the housing 300. The housing 300 may also include an opening 326 for mounting a dogging arm 180 operable in a dogged state and an undogged state. In the dogged state, the dogging arm 180 engages the dogging tab 224, thereby retaining the link 200 in the retracted position and the latch bolt 30 in the inner or unlocked state. In the undogged state, the dogging arm 180 does not engage the dogging tab 224, and the link 200 is free to move between the extended and retracted positions. A spring may have one end connected to a tab 328 having a slot 329, and the other end connected to the dogging arm 180 such that the dogging arm 180 is biased toward the dogged position or the undogged position.

Figure 11:
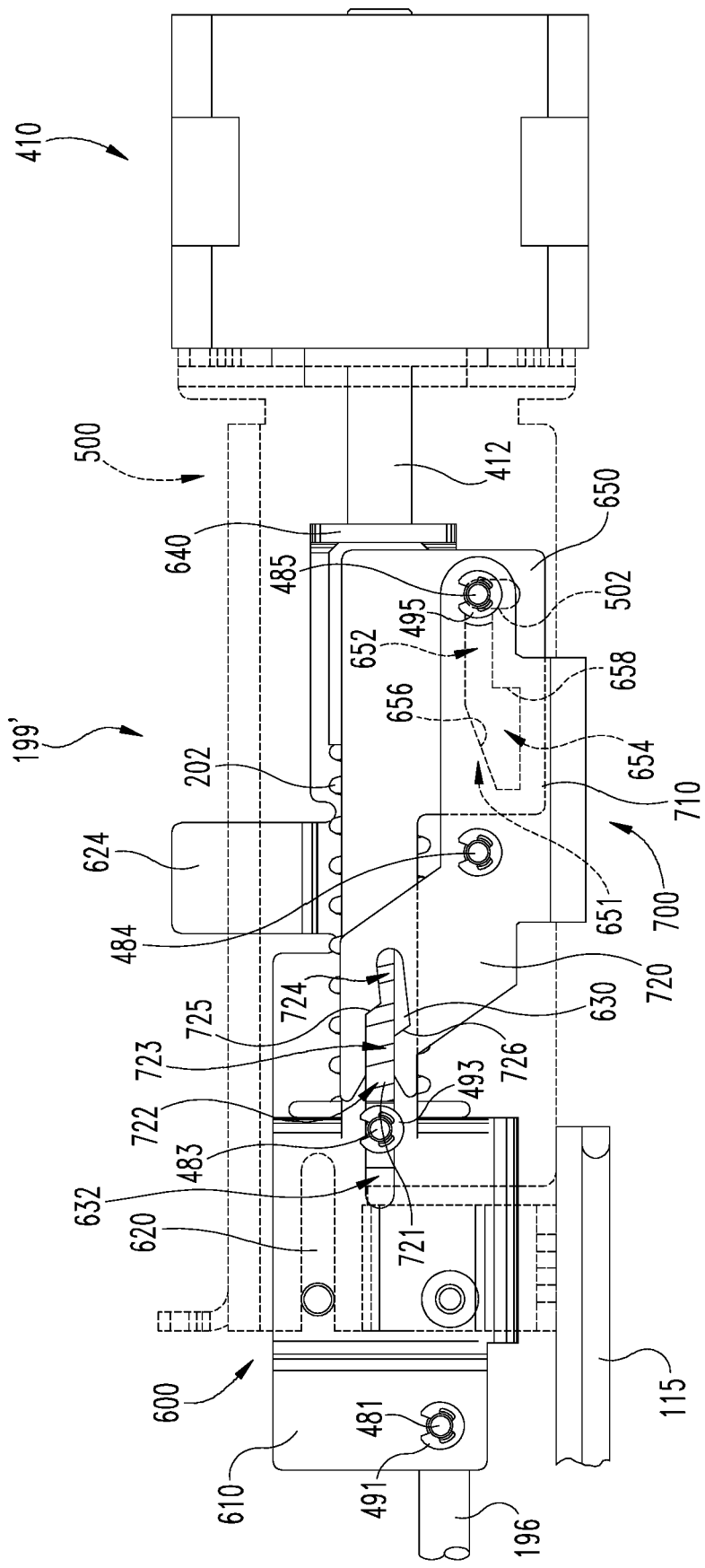
FIGS. 11 and 12 illustrate another embodiment of the over-travel assembly illustrated in FIG. 5.
Figure 12:
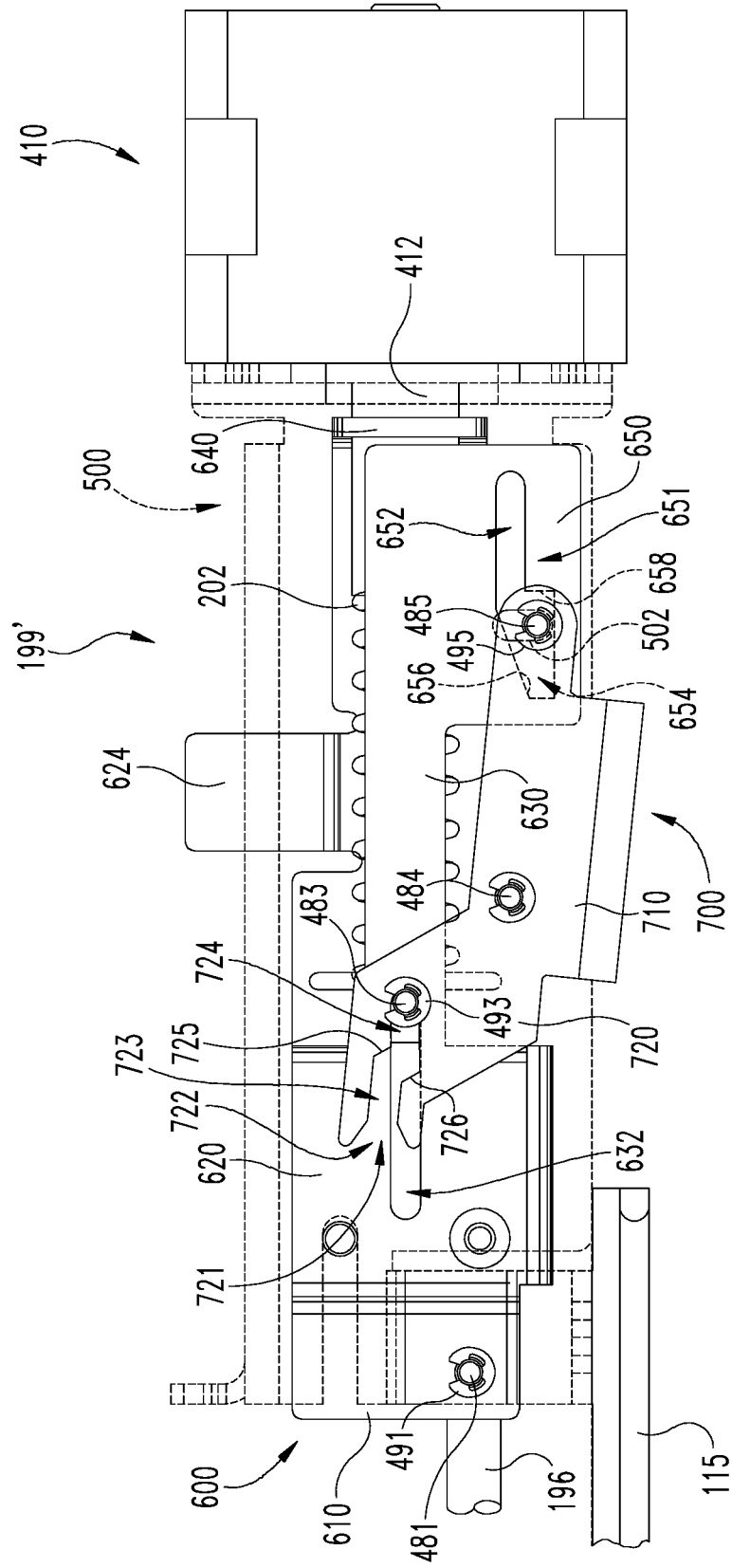

In other forms, the over-travel assembly 199 may include features to provide the exit device 10 with improved resistance to tampering. FIGS. 11 and 12 depict an illustrative embodiment of such a tamper-resistant over-travel assembly 199'. The over-travel assembly 199' includes a housing 500, a link 600, and a bracket 700. The housing 500 and link 600 are substantially similar to the previously-described housing 300 and link 200, and similar reference characters are used to denote similar elements. For example, the link 600 includes coupling arms 610, side walls 620, a tab 624, and an end wall 640, which respectively correspond to the coupling arms 210, side walls 220, tab 224, and end wall 240 of the above-described link 200. In the interest of clarity, the following description focuses primarily on features which are different than those previously described.

In the link 600 of the illustrated embodiment, the arms 630 include depending portions 650 which define the openings 651. Each of the openings 651 includes a slotted portion 652 configured to slidingly receive a blocking pin 495, and an enlarged portion 654 defined in part by a ramp 656 and a ridge 658. The functions of the ramp 656 and the ridge 658 are described in further detail below.

The bracket 700 includes side walls 710 including apertures (not labeled), and arms 720 extending toward the beam 196. The bracket 700 is pivotably mounted to the housing 500 by a pivot pin 484 extending through a first set of apertures in the housing 500 and the side walls 710. The bracket 700 is also slidingly coupled to the link 600 by a blocking pin 485 extending through the openings 651, a second set of apertures formed in the side walls 710, and slots 502 in the housing 500. The slots 502 limit the pivotal range of the bracket 700 by limiting the range of motion of the blocking pin 485. Each of the arms 720 defines a channel 721 including a mouth 722, a first slot 723, and a second slot 724.

FIG. 11 depicts the motor shaft 412 in the locked position, the link 600 in an extended position, and the bracket 700 in a home position. When the bracket 700 is in the home position, the first slot 723 is aligned with the slot 632 in the arm 630. In a manner similar to that described above with reference to FIGS. 8-10, movement of the motor shaft 412 from the locking position toward the unlocking position causes the link 600 to move from the extended position toward a retracted position (FIG. 12). If the bracket 700 is not in the home position when the motor shaft 412 begins retracting, the guide pin 483 engages the tapered surface of the mouth 722, thereby causing the bracket 700 to pivot into the home position. As the link 600 moves from the extended position to the retracted position, the blocking pin 485 travels into the enlarged portion 654 where the ramp 656 may urge the blocking pin 485 into alignment with the ridge 658. As the motor 410 continues to retract the shaft 412, the guide pin 483 travels along a ramp 725 toward the second slot 724, thereby causing the bracket 700 to pivot to a rotated position (FIG. 12) in which the second slot 724 is aligned with the arm slot 623. The guide pin 483 continues to travel along the second slot 724 as the motor shaft 412 continues to move toward the over-travel position.

FIG. 12 depicts the motor shaft 412 in the over-travel position, the link 600 in the retracted position, and the bracket 700 in the rotated position. When the motor shaft 412 is in the over-travel position, the pin 485 is aligned with the ridge 658. If a person attempts to force the pushbar 25 from the inner state toward the outer state, the beam 196 transmits such force to the link 600. The tampering force is transmitted from the link 600 to the bracket 700 (due to engagement of the ridge 658 and the blocking pin 485), which, due to its fixed longitudinal position with respect to the housing 500, prevents movement of the link 600. The fixed longitudinal position of the link 600 prevents movement of the beam 196, which in turn prevents movement of the pushbar 25 and the latch bolt 30 toward their outer or locked positions.

Once the microcontroller 424 determines that the latch bolt 30 should be returned to its outer state such as, for example, upon receiving a command from the user, or after a predetermined amount of time has elapsed since the latch-retracting operation, the microcontroller 424 supplies power to the motor 410 such that the motor 410 runs in reverse. Reverse operation of the motor 410 causes the motor shaft 412 to move from the over-travel position toward the unlocked position, thereby moving the guide pin 483 along the link slot 632 and the second bracket slot 724. When the guide pin 483 reaches the end of the second bracket slot 724, it engages a second ramp 726, thereby urging the bracket 700 from the rotated position toward the home position. This in turn causes the blocking pin 485 to travel along the housing slots 502 to a position in which the blocking pin 485 is no longer aligned with the ridge 658. In this position of the blocking pin 485, the link 600 is free to move from the retracted position to the extended position as the blocking pin 485 can be received in the slotted portion 652 of the opening 651. Continued movement of the motor shaft 412 toward the locking position causes the latch bolt 30 to move toward the outer state, at which point the door 15 is locked.

While the invention has been illustrated and described in detail in the drawings and foregoing description, the same is to be considered as illustrative and not restrictive in character, it being understood that only the preferred embodiments have been shown and described, and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. An exit device, comprising:
a latch having an extended position and a retracted position;
a link operably connected with the latch such that movement of the link from a first link position to a second link position causes a corresponding movement of the latch from the extended position to the retracted position;
a motor shaft engaged with the link via a spring such that movement of the motor shaft from a first motor shaft position to a second motor shaft position causes a corresponding movement of the link from the first link position to the second link position;
a motor operable to linearly drive the motor shaft from the first motor shaft position to the second motor shaft position and from the second motor shaft position to a third motor shaft position, wherein the second motor shaft position is between the first motor shaft position and the third motor shaft position, wherein the motor is positioned distal to the link, and wherein the motor shaft projects beyond a distal side of the motor when the motor shaft is in the third motor shaft position;
a sensor operable to detect the motor shaft during movement of the motor shaft between the second motor shaft position and the third motor shaft position, wherein an output of the sensor varies during the movement of the motor shaft between the second motor shaft position and the third motor shaft position; and a controller configured to cause the motor to drive the motor shaft from the first motor shaft position toward the third motor shaft position in response to a start condition, and to cause the motor to halt movement of the motor shaft in response to detection of the motor shaft by the sensor;

wherein the spring is configured to deform during movement of the motor shaft from the second motor shaft position to the third motor shaft position to thereby permit the link to remain in the second link position during the movement of the motor shaft from the second motor shaft position to the third motor shaft position.

2. The exit device of claim 1, further comprising a housing including a slot and a mounting aperture for mounting a dogging arm to the housing;

wherein the link includes a dogging tab that extends through the slot and is operable to be engaged by the dogging arm.

3. The exit device of claim 1, further comprising:

a housing secured to the motor, the housing comprising a housing slot; and a pin extending through the housing slot and a link slot of the link;

wherein the link slot, the housing slot, and the pin cooperate to limit the link to movement between the first link position and the second link position.

4. The exit device of claim 1, further comprising a control module positioned distal to the motor, the control module comprising the sensor and the controller.

5. The exit device of claim 4, wherein the control module comprises a control module housing including an aperture operable to receive a portion of the motor shaft.

6. An access control device, comprising:

a latch;

a housing;

a link movably mounted in the housing for movement between a first link position and a second link position, wherein the link is operable to retract the latch;

a motor shaft engaged with the link via a spring such that movement of the motor shaft from a first motor shaft position to a second motor shaft position causes the link to retract the latch, wherein the spring is configured to deform during movement of the motor shaft from the second motor shaft position to a third motor shaft position to thereby permit the link to remain in the second link position during the movement of the motor shaft from the second motor shaft position to the third motor shaft position;

a motor operable to linearly drive the motor shaft from the first motor shaft position to the second motor shaft position and from the second motor shaft position to the third motor shaft position, wherein the second motor shaft position is between the first motor shaft position and the third motor shaft position; and a sensor configured to generate information that varies as the motor shaft moves from the second motor shaft position to the third motor shaft position.

7. The access control device of claim 6, further comprising a mounting plate;

wherein the housing is secured to the mounting plate.

8. The access control device of claim 6, wherein the housing is secured to a body of the motor.

9. The access control device of claim 6, wherein the housing comprises a mounting aperture for mounting a dogging arm to the housing; and wherein the link comprises a dogging tab configured for engagement with the dogging arm.

10. The access control device of claim 9, wherein the housing comprises a slot; and wherein the dogging tab extends through the slot.

11. The access control device of claim 6, further comprising a controller configured to cause the motor to drive the motor shaft from the first motor shaft position toward the third motor shaft position in response to a start condition, and to cause the motor to halt movement of the motor shaft in response to determining that the motor shaft has reached the third motor shaft position based on the information generated by the sensor.

12. An access control device, comprising:

a latch;

a link operable to retract the latch;

a motor shaft including a proximal end portion and a distal end portion, wherein the proximal end portion is engaged with the link via a spring such that movement of the motor shaft from a proximal motor shaft position to an intermediate motor shaft position causes the link to retract the latch, wherein the spring is configured to deform during movement of the motor shaft from the intermediate motor shaft position to a distal motor shaft position to thereby permit the link to remain stationary during the movement of the motor shaft from the intermediate motor shaft position to the distal motor shaft position;

a motor positioned distally of the link, the motor operable to linearly drive the motor shaft between the proximal motor shaft position, the intermediate motor shaft position, and the distal motor shaft position; and a control module positioned distally of the motor, the control module comprising:

a control module housing operable to receive the distal end portion of the motor shaft;

a sensor mounted in the control module housing and configured to provide a varying output as the motor shaft moves between the intermediate motor shaft position and the distal motor shaft position; and a controller mounted in the control module housing, wherein the controller is configured to cause the motor to drive the motor shaft toward the distal motor shaft position in response to a start condition, and to halt movement of the motor shaft in response to detection of the motor shaft by the sensor.

13. The access control device of claim 12, wherein the control module housing is secured to a body of the motor.

14. The access control device of claim 12, further comprising:

a link housing in which the link is movably received, wherein the link housing includes a slot; and a pin engaged with the proximal end portion of the motor shaft and extending through the slot such that the slot limits the link to movement between a first link position and a second link position.

15. The access control device of claim 12, further comprising a link housing including a mounting aperture for mounting a dogging arm to the link housing;

wherein the link comprises a dogging tab operable to be engaged by the dogging arm.

16. The access control device of claim 15, wherein the link housing further comprises a slot through which the dogging tab extends.

17. The access control device of claim 12, further comprising a magnet mounted to the distal end portion of the motor shaft;

wherein the sensor is operable to detect the motor shaft by detecting the magnet.

\* \* \* \* \*